United States Patent [19]

Lipchak et al.

[11] Patent Number: 5,126,869
[45] Date of Patent: Jun. 30, 1992

[54] TWO-DIMENSIONAL, PHASED-ARRAY OPTICAL BEAM STEERER

[75] Inventors: W. Michael Lipchak, Sterling; Terry A. Dorschner, Newton Centre, both of Mass.

[73] Assignee: Raytheon Company, Lexington, Mass.

[21] Appl. No.: 621,706

[22] Filed: Dec. 3, 1990

[51] Int. Cl.$^5$ .............................................. G02F 1/13
[52] U.S. Cl. ...................................... 359/94; 359/53; 359/93; 359/95; 359/494
[58] Field of Search ................... 350/337, 347 V, 348, 350/334, 335, 339 R, 347 E; 359/53, 73, 93, 94, 95, 494, 495

[56] References Cited

U.S. PATENT DOCUMENTS

| | | | |
|---|---|---|---|
| 4,639,091 | 1/1987 | Huignard et al. | 350/347 V |
| 4,813,766 | 3/1989 | Keene et al. | 350/335 |
| 4,937,539 | 6/1990 | Grinberg et al. | 350/348 |
| 4,964,701 | 10/1990 | Dorschner et al. | 350/336 |
| 5,013,140 | 5/1991 | Healey et al. | 350/335 |
| 5,018,835 | 5/1991 | Dorschner | 350/347 V |

OTHER PUBLICATIONS

"Radar Handbook," Merrill I. Skolnik, Naval Research Laboratory, McGraw-Hill, New York, 1970, pp. 11-1 to 11-21.

Primary Examiner—Andrew J. James
Assistant Examiner—Minhloan Tran
Attorney, Agent, or Firm—Christopher L. Maginniss; Richard M. Sharkansky

[57] ABSTRACT

An optical beam steering device for use in a single-aperture laser transceiver system provides deflection of the transmitted and received beam in two planes, while maintaining the distinctive identities, of each channel respective to their polarizations. The invention utilizes four single-dimensional beam deflecting devices, two for each orthogonal linear polarization of the two transceiver channels, one of these for each steering axis. In addition, a 90° polarization rotator and a quarter-wave plate are included in the arrangement of beam deflecting devices to satisfy the polarization requirements of these devices and of the transceiver channels. In a preferred embodiment, the beam deflecting devices comprise liquid crystal cells functioning as variable phase retarders, each of the cells comprising a first window having a common electrode, a second window having a multiplicity of electrodes in the form of electrically isolated, parallel stripes, and a layer of liquid crystal molecules intermediate the first and second windows. Means are provided for coupling a multiplicity of control signals individually between the multiplicity of stripe electrodes and the common electrode, thereby creating selectable local variations of refractive index in the liquid crystal layer.

19 Claims, 4 Drawing Sheets

TWO-DIMENSIONAL, PHASED-ARRAY OPTICAL BEAM STEERER

BACKGROUND OF THE INVENTION

This invention relates generally to optical beam systems and, more particularly, to a two-dimensional, phased-array beam steerer for use in a laser radar system.

There are currently very pressing needs for rapid, large-angle pointing and scanning of laser beams of all wavelengths from the infrared through the ultraviolet. These needs include strictly military applications such as laser weapons, which require agile, high-energy laser pointing, and laser radar, used for target search, acquisition, tracking and surveillance. There are also purely commercial needs such as laser light shows and laser printing, which require rapid, programmable beam steering. In addition, there are also many areas common to both military and commercial interests such as optical computing and image processing, which require rapid scanning of spatial light modulators, and optical data storage requiring rapid optical addressing. In most of these cases, the impediment to effective performance of the optical system is in the area of beam steering.

Presently available technologies are generally not sufficiently advanced to supply the need for rapid, large-angle pointing and scanning of optical beams and, in particular, of large diameter, diffraction-limited carbon dioxide ($CO_2$) laser radar beams. In many systems, optical beam steering is currently performed using rotating optical elements. Such systems typically consist of galvanometer mirrors and afocal telescopes, performance being limited to beam diameters of somewhat less than six inches, a field of view of approximately five degrees in each direction, and a frame time of approximately one second with a few thousand resolution cells and open-loop, random-access time on the order of ten milliseconds. The capability of handling larger beams is required for higher power systems, particularly for many of the military applications for laser radar systems Larger fields of view and larger apertures, on the order of one-half to one meter diameter, are of great interest, and faster scan times are desired for many applications. In short, there exists a pressing need for an optical version of the versatile phased-array antennas now widely used for microwave radar systems.

A static deflector for deflecting a polarized infrared beam is suggested by U.S. Pat. No. 4,639,091, issued Jan, 27, 1987, to J.-P. Huinnard et al. The Huignard et al. deflector comprises a layered square plate having as a front layer a window on which stripe electrodes are disposed. Both the window and the stripe electrodes are transparent to an incident infrared beam. A middle layer of the deflector comprises an electro-optical liquid crystal layer. The bottom layer comprises a substrate having a common electrode adjacent to the liquid crystal layer. The common electrode is preferably reflective at the beam wavelength; illustratively, it is a gold film. Alternatively, for a deflector operating by transmission, a transparent rear plate may be used.

Huignard et al. and others in the microwave phased-array antenna arts have suggested a periodic staircase waveform comprising N voltage steps which are applied to the stripe electrodes, thereby creating local variations of the refractive index in the liquid crystal layer in such a manner as to form a beam diffraction grating of adjustable period.

The specific application which supplies the impetus for the present invention is a laser radar system. Such a system requires optical beam steerers which provide rapid, non-mechanical, random-access pointing of large optical beams, on the order of one meter diameter. The requirement of random-access pointing necessitates deflection of the beam along two dimensions. Huignard et al. address the concept of two-directional X-Y deflection of a beam by suggesting that two static deflectors be assembled having their control electrodes at 90° to each other. Alternatively, Huignard et al. suggest using a matrix of individually addressable points rather than strip electrodes.

However, due to the precious nature of aperture area in radar-bearing vehicles (aircraft, missiles, satellites, tanks, etc.), existing laser radar transceivers typically multiplex a single output aperture between transmitter and receiver by using orthogonal circular polarizations on the separate channels. A difficulty arises, then, in employing one or more liquid crystal arrays to point the beam, since the operation of currently known, liquid crystal phased arrays requires linear polarization.

SUMMARY OF THE INVENTION

It is therefore an object of the present invention to provide a two-dimensional, phased-array beam steerer for use in an optical transceiver.

It is an additional object of the present invention to provide a two-dimensional optical beam steerer for use in a single-aperture optical transceiver.

It is a still further object of the present invention to provide a two-dimensional optical beam steerer that accommodates the linear polarization requirements of parallel-aligned, liquid crystal phase shifting elements as well as the polarization requirements of the transceiver channels of a single-aperture laser radar system.

In accordance with the principles of the present invention, there is disclosed a combination of optical elements. The combination comprises first deflector means, responsive to beams of optical radiation of first and second linear, orthogonally related polarizations, for deflecting the beams in first and second substantially orthogonally related directions, and means for altering the direction of linear polarization of a beam of optical radiation by ninety degrees. The combination further comprises second deflector means substantially identical to the first deflector means, and means for transforming the polarization of a beam of optical radiation between linear and circular polarizations. All of the above-mentioned elements are arranged in the recited order along a common optical path.

In accordance with a preferred embodiment of the present invention, the first and second deflector means each comprises a first optical beam deflector, responsive to a first beam of optical radiation of a first linear polarization, for deflecting the first beam in a first substantially planar surface, and a second optical beam deflector, responsive to a second beam of optical radiation of a second linear polarization orthogonal to the first linear polarization, for deflecting the second beam in a second substantially planar surface substantially orthogonal to the first planar surface.

Further in accordance with a preferred embodiment of the present invention, the polarization altering means comprises a polarization rotator, typically a half-wave plate, the polarization transforming means comprises a quarter-wave plate, and each of the beam deflectors comprises a liquid crystal cell element including a first window having a common electrode, a second window having a multiplicity of electrodes in the form of electrically isolated, parallel stripes, and a layer of liquid crystal molecules intermediate the first and second windows, and means for coupling a multiplicity of control signals individually between the multiplicity of stripe electrodes and the common electrode, thereby creating selectable local variations of refractive index in the liquid crystal layer.

With this arrangement, there is provided a two-dimensional optical beam steerer that accommodates the linear polarization requirements of parallel-aligned, liquid crystal phase shifting elements as well as the orthogonal circular polarization requirements of the transceiver channels of a single-aperture laser radar system.

BRIEF DESCRIPTION OF THE DRAWINGS

Other features and advantages of the present invention will be more fully understood from the following detailed description of the preferred embodiment, the appended claims, and the accompanying drawings, in which:

DESCRIPTION OF THE PREFERRED EMBODIMENT

The invention disclosed in the illustrative embodiments herein relates to an optical subsystem for use in a single-aperture laser radar system. The optical subsystem provides deflection of the transmitted and received beams in two planes, while maintaining the distinctive identities of each channel respective to their polarizations. The invention utilizes four single-dimensional beam deflecting devices, two for each orthogonal linear polarization of the two transceiver channels, one of these for each steering axis. In addition, a 90° polarization rotator and a quarter-wave plate are included in the arrangement of beam deflecting devices to satisfy the polarization requirements of these devices and of the transceiver channels.

By way of example, the present invention employs liquid crystal devices as the phase shifting elements, which may generally be of the type suggested in the above-mentioned Huignard et al. patent, but which are more specifically similar to the phase shifting elements disclosed and described in U.S. Pat. No. 4,964,701, "Deflector for an Optical Beam," issued Oct. 23, 1990, to Terry A. Dorschner et al., and assigned to the same assignee as the present invention, which patent ('701) is incorporated herein by reference.

Figure 1:
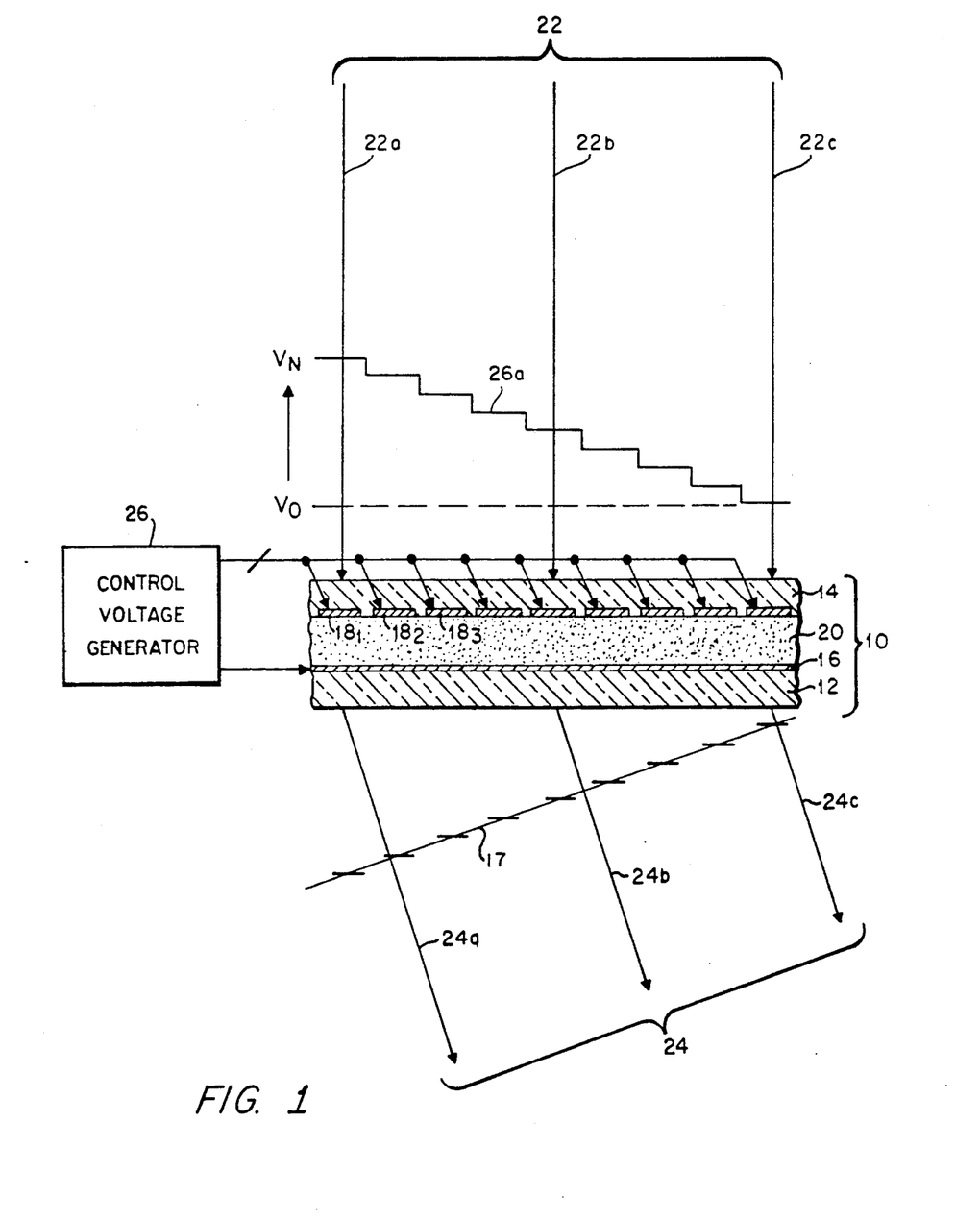
FIG. 1 is a diagrammatical cross-sectional view of a liquid crystal beam deflector providing beam steering in one dimension.

Referring to FIG. 1, there is shown, in diagrammatical cross-sectional view, a liquid crystal beam steering device 10 of the type used in the present invention, and which is a simplified representation of the beam steerer described in the Dorschner et al. patent. Device 10 comprises a liquid crystal cell having windows 12 and 14 which are optically transparent at the frequency range of interest. Common electrode 16, affixed to window 12, is electrically conductive and optically transparent. Electrodes $18_1$, $18_2$, $18_3$, ..., referred to collectively as electrodes 18, affixed to window 14, comprise a plurality of electrically conductive, optically transparent stripes. The space between windows 12 and 14 is filled with a layer of liquid crystal molecules 20, illustratively long, thin, rod-like organic molecules of the so-called "nematic" phase.

The referenced Dorschner et al. patent teaches the use of alignment layers on the inner surfaces of windows 12 and 14 to properly align the liquid crystal molecules at the boundaries of layer 20. The appropriate alignment of the liquid crystal molecules, such that liquid crystal cell 10 functions properly as a variable phase retarder, is parallel to the polarization of the incident light. It has also been determined that a preferable alignment of the liquid crystal molecules is orthogonal to the longitudinal edges of the stripe electrodes 18. For the balance of this disclosure, this preferable alignment will be assumed, with the result that a beam having linear polarization aligned orthogonal to the longitudinal edges of stripe electrodes 18 will be deflected in response to control voltages applied thereon, while a beam having linear polarization parallel to the longitudinal edges of stripe electrodes 18 will pass through liquid crystal cell 10 undeflected.

The optical beam phase shifter 10 of FIG. 1 is responsive to a light source and beam forming network (not shown) which provide a polarized, light beam 22, ranging from visible through far infrared. In this example, beam 22 is in the infrared spectrum, having a typical wavelength in the range of 9 to 11.5 $\mu$meters ($\mu$m), illustratively at 10.6 $\mu$m. Light beam 22, represented in part by rays 22a–22c, is directed onto window 14 of optical device 10. Light beam 22 may be incident perpendicular to the plane formed by stripe electrodes 18, or it may be incident obliquely, preferably such that its projection onto the plane formed by stripe electrodes 18 is parallel to the longitudinal direction of electrodes 18. In other words, the longitudinal edges of stripe electrodes 18 are parallel to the plane of incidence of rays 22a–22c.

It is characteristic of liquid crystal molecules whose orientation is well-defined by alignment layers as described above, that the application of an electric field perpendicular to the alignment layer affects the speed of light whose polarization is parallel to the alignment layers propagated therethrough, and hence, the retardance. Thus, in the simplified example of FIG. 1, the application of different potentials between common electrode 16 and the individual stripe electrodes 18 from control voltage generator 26 results in differential electric fields in the regions between the individual stripe electrodes 18 and common electrode 16, thereby creating local variations of the refractive index in the liquid crystal layer 20. For ease of understanding, a limited number of stripe electrodes 18 are shown in FIG. 1, whereas, in an actual beam steerer embodying the present invention, there may be many thousands of such stripes.

In the present simplified example, the potentials applied to the electrodes 18 onto which rays 22a, 22b and 22c are incident, shown diagrammatically as staircase waveform 26a, are such as to cause the greatest phase retardation to emergent ray 24c, and the least phase retardation to emergent ray 24a. Thus, the wavefront 17 of the beam 24 which emerges from the optical beam deflector 10 is deflected from the plane of incidence. If identical potential is applied to all electrodes 18, the refractive index of the liquid crystal layer 20 is uniform, and beam 24 is undeflected It is therefore seen that the optical beam deflector 10 of FIG. 1 provides selective beam steering in accordance with the electrical potentials applied to stripe electrodes 18.

The application of control voltage signals to the individual stripe electrodes 18 for the purpose of beam steering is analogous to the methods used in conventional microwave radar beam steering as taught, for example, in *Radar Handbook*, M.I Skolnik, ed., McGraw-Hill, New York, 1970, at chapter 11. As shown by illustrative waveform 26a, a plurality of control voltage signals, being periodic in space and having a continuous progression of voltage steps within each period between a minimum value and a maximum value, may be applied to the multiplicity of stripe electrodes 18. However, it is not intended to limit the present invention only to pluralities of control voltage signals which are periodic.

Whereas the illustrative beam steering device 10 of FIG. 1 operates in the transmission mode for light beam 22 incident on window 14 having stripe electrodes 18, the cited references suggest that many variations of this arrangement may be effected. As a first example of such variations, light beam 22 may be incident on window 12 having common electrode 16 and emerge deflected from window 14. As a second example, common electrode 16 may be reflective at the optical wavelength of interest, and light beam 22 would be incident on, and emerge deflected from window 14. As a third example, stripe electrodes 18 may be optically reflective, and light beam 22 would be incident on, and emerge deflected from, window 12. (In this latter example, the narrow spacings between the stripes 18 may be minimized in order to minimize any extraneous grating patterns which otherwise might exist.) In another example, common electrode 16 and/or stripe electrodes 18 may be formed on the outside of their respective windows 12, 14. away from the liquid crystal layer 20. Finally, both common electrode 16 and stripe electrodes 18 may be optically transparent, and an additional optically reflective layer (not shown) may be added to device 10 against either window 12 or 14 to operate device 10 in the reflection mode. It is intended that these, as well as other known and obvious variants, are to be included within the scope of the invention to be described herein.

Although the liquid crystal cells discussed herein employ homogeneously aligned liquid crystal molecules which align parallel to an applied electric field (similar to the liquid crystal BHD E7 used in the present example), there are other homeotropic liquid crystal types of opposite anisotrophy, which align perpendicular to an applied field. It will be obvious to one of skill in the art to substitute these other liquid crystal types and make the appropriate modifications of beam polarizations and liquid crystal alignment layers so as to produce a beam steerer which accords with the principles of the present invention.

Figure 2:
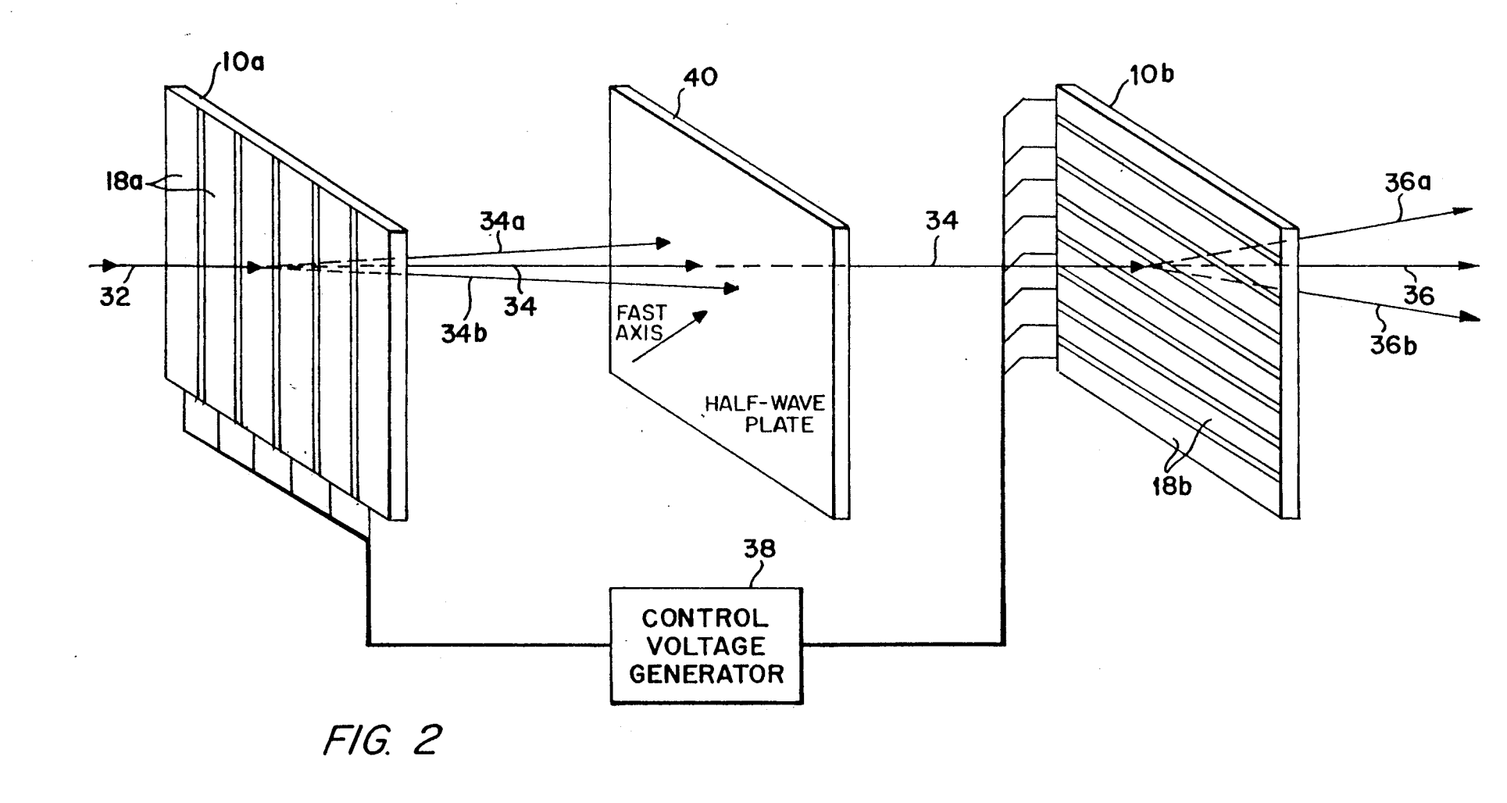
FIG. 2 illustrates a two-dimensional beam steerer using the liquid crystal beam deflector of FIG. 1.

Referring to FIG. 2, there is shown a two-dimensional optical beam steerer comprising beam steering devices 10a and 10b, which may be of the type shown in FIG. 1 as beam steerer 10. A 90° polarization rotator 40 is located in the optical path between beam steering devices 10a and 10b. In the present example, polarization rotator 40 will be described as a half-wave plate: alternatively, it may comprise a twisted nematic liquid crystal cell.

Device 10a is positioned such that an incident, linearly polarized light beam 32 is directed either normal to the surface of device 10a including vertical stripe electrodes 18a, or obliquely onto this surface of device 10a, preferably such that its projection onto the plane formed by stripe electrodes 18a is parallel to the direction of the stripes 18a. If the polarization of beam 32 is parallel to the alignment layers, device 10a will steer its output beam along a linear direction which is parallel to the alignment layers, that is, perpendicular to vertical stripes 18a.

The beams emerging from beam steering device 10a are either undeflected (beam 34), or are deflected left (beam 34a) or right (beam 34b), depending on the control voltages applied to the individual vertical stripe electrodes 18a from control voltage generator 38. Considering only undeflected beam 34, it passes through half-wave plate 40 having its fast axis oriented such that the polarization is rotated by ninety degrees. In this particular example, the transformation is from horizontal to vertical polarization.

Beam 34 is then incident on beam steering device 10b, either normal to the surface of device 10b including horizontal stripe electrodes 18b, or obliquely onto this surface of device 10b, preferably such that its projection onto the plane formed by stripe electrodes 18b is parallel to the direction of the stripes 18b. If the polarization of beam 34 is parallel to the alignment layers, device 10b will deflect its output beam along a linear direction which is parallel to the alignment layers, that is, perpendicular to horizontal stripes 18b.

The beams emerging from beam steering device 10b are either undeflected (beam 36), or are deflected up (beam 36a) or down (beam 36b), depending on the control voltages applied to the individual horizontal stripe electrodes 18b from control generator 38.

Figure 3:
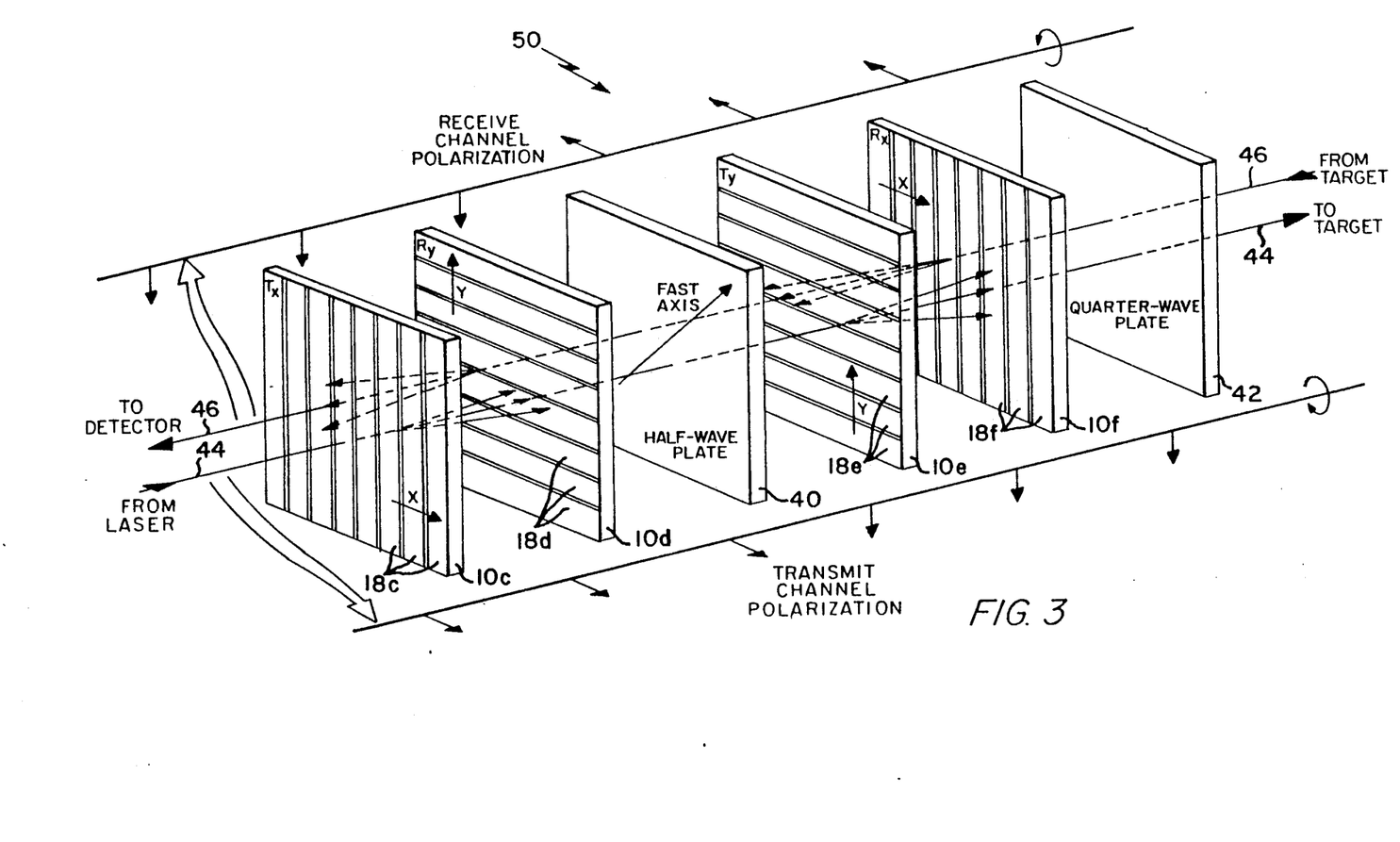
FIG. 3 illustrates a two-dimensional beam steerer which accommodates transceiver channel polarization requirements, in accordance with the principles of the present invention.

In accordance with the teachings of the present invention, FIG. 3 illustrates an arrangement of optical devices which provides two-dimensional beam steering for use in a single-aperture laser optical transceiver system. The illustrative beam steerer of FIG. 3 includes four one-dimensional liquid crystal beam steering devices 10c, 10d, 10e and 10f, which may be of the type shown as device 10 in FIG. 1, a 90° polarization rotator, which may typically comprise half-wave plate 40, and a quarter-wave plate 42. These six optical elements are arranged as shown along a single optical path. This example depicts all of the optical elements 10c–10f, 40, and 42 as transmissive; in this case the single optical path common to all of these elements is a substantially straight line. Alternatively, any one or more of the optical elements 10c–10f, 40, and 42 may be reflective; in this case the single optical path common to all of these elements is a plurality of distinct line segments.

Any two or more of the above-described six optical elements may be joined in a single laminate. In the case of all transmissive elements, all six optical elements may be sandwiched together in a single structure.

In order to facilitate understanding of the operation of beam steerer 50, the illustration of FIG. 3 includes representations of the beam polarizations for both the transmit and receive channels before and after beam passage through each of the optical elements of beam steerer 50. In the simplified illustration of FIG. 3, it will be noted that only the on-boresight beam is shown continued through the entire optical system. At those elements where beam deflection may occur, shortened deflected beam representations are shown.

Considering first the transmit channel, a collimated, horizontally polarized, laser beam 44 is incident upon transmit X-axis beam steerer 10c, and may be deflected horizontally, depending on the control voltages applied to the plurality of stripe electrodes 18c thereon. Transmit beam 44 passes undeflected through receive Y-axis beam steerer 10d, since stripe electrodes 18d are oriented parallel to the polarization of beam 44 at this point (with liquid crystal alignment orthogonal to the input polarization).

Transmit beam 44 then passes through half-wave plate 40 which rotates its polarization by 90°. Beam 44 is then incident upon transmit Y-axis beam steerer 10e, and may be deflected vertically, depending on the control voltages applied to the plurality of stripe electrodes 18e thereon. Transmit beam 44 passes undeflected through receive X-axis beam steerer 10f, since stripe electrodes 18f are oriented parallel to the polarization of beam 44 at this point.

Finally, transmit beam 44 passes through quarter-wave plate 42 which transforms its polarization from linear to circular polarization before radiating to the target.

Considering now the receive channel, a circularly polarized receive beam 46 (of opposite handedness from the circularly polarized radiated beam 44) has been reflected from a target and passes through quarter-wave plate 42, which transforms its polarization to linear. Beam 46 is then incident upon receive X-axis beam steerer 10f, and may be deflected horizontally, depending on the control voltages applied to the plurality of stripe electrodes 18f thereon. Receive beam 46 passes undeflected through transmit Y-axis beam steerer 10e, since stripe electrodes 18e are oriented parallel to the polarization of beam 46 at this point.

Receive beam 46 then passes through half-wave plate 40 which rotates its polarization by 90°. Beam 46 is then incident upon receive Y-axis beam steerer 10d, and may be deflected vertically, depending on the control voltages applied to the plurality of stripe electrodes 18d thereon. Receive beam 46 passes undeflected through transmit X-axis beam steerer 10c, since stripe electrodes 18c are oriented parallel to the polarization of beam 46 at this point.

It will be recognized, however, that it is also possible to operate the liquid crystal beam steering device 10 (see FIG. 1) in which the alignment of the liquid crystal molecules at the boundaries of layer 20 is parallel to the longitudinal edges of stripe electrodes 18. In this case, a beam having linear polarization aligned with the longitudinal edges of stripe electrodes 18 will be deflected in response to control voltages applied thereon, while a beam having linear polarization orthogonal to the longitudinal edges of stripe electrodes 18 will pass through liquid crystal cell 10 undeflected. Referring now to FIG. 3, it may be seen that, for this embodiment, half-wave plate 40 is not required. Transmit X-deflector 10c and receive Y-deflector 10d may illustratively have liquid crystal alignment layers orthogonal to their stripe electrodes 18c, 18d, while transmit Y-deflector 10e and receive X-deflector 10f have liquid crystal alignment layers parallel to their respective stripe electrodes 18e, 18f. The polarization in the transmit channel beam 44 of FIG. 3 would then be everywhere horizontal, for example, and the polarization of the receive channel beam 46 everywhere vertical. The system operates otherwise as described above.

Thus, it is seen that beam steerer 50 satisfies the requirements of a two-dimensional beam steerer for use in the transceiver channels of a single-aperture optical system. The transmit beam 44 is X-Y deflected and its linear polarization is transformed to circular. Beam steerer 50 is also responsive to a circularly polarized receive beam 46 (of opposite handedness of transmit beam 44), providing X-Y steering and outputting a linearly polarized beam 46 which is orthogonally related to the input transmit beam 44.

It will be noted at this point that for a non-normal beam incidence, such as the incidence of transmit beam 44 on beam steerer 10e following deflection from beam steerer 10c, or the incidence of receive beam 46 on beam steerer 10d following deflection from beam steerer 10f, the loci of deflected beams from the latter devices 10e and 10d, in each case, are mildly arcuate surfaces, wherein the degree of curvature of the arc is a function of the extent of the deviation from normal of the incident beam. Thus, for a non-normal beam incidence, the "plane" of deflection is not precisely a flat planar surface, but a slightly curved surface. Any scanning distortion introduced because of this non-linearity may be compensated for in the control voltage generator.

Figure 4:
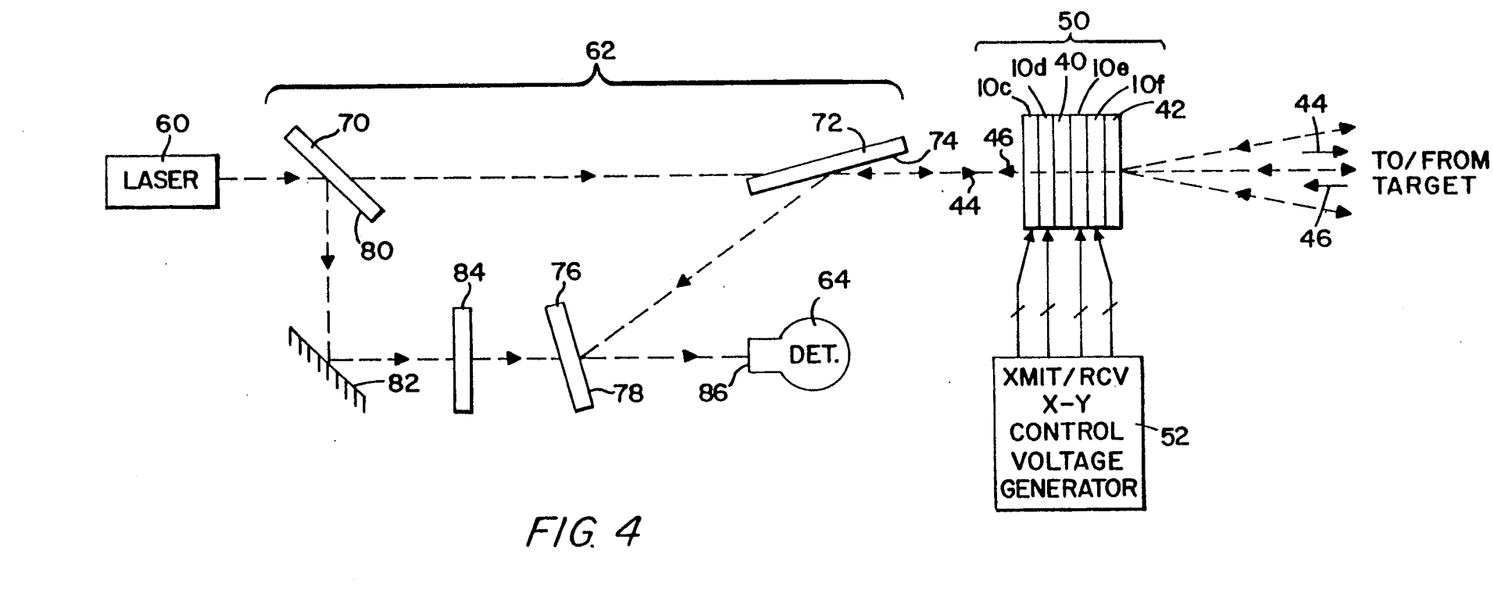
FIG. 4 is a block diagram of a laser radar system including the beam steerer of FIG. 3.

Referring now to FIG. 4, there is shown a block diagram depicting the elements and interconnections of a portion of a laser radar system employing the beam steering device 50 of the present invention. The illustrated radar system includes a laser 60 for producing a beam of electromagnetic energy which is then transmitted through interferometer 62. Laser 60 comprises any known type of laser which will meet the requirements of the required application, and here, for a selected wavelength in the infrared range, a preferred type is a $CO_2$ laser producing a diffraction limited beam at a nominal operating frequency corresponding to the 10.6 $\mu$meters transition. A portion of the generated laser beam is reflected by interferometer 62 and is used as the local oscillator beam.

The portion of the transmitted beam that is retroreflected by a target present in the field of view is returned to interferometer 62 and is then directed to homodyne detector 64. Detector 64 is used to mix or homodyne the return signals with the local oscillator signal which is derived from a portion of the instantaneous transmitted beam. For the example where laser 60 comprises a $CO_2$ laser, detector 64 may be a mercury cadmium telluride (HgCdTe) photovoltaic detector. The output of detector 64 is a homodyned signal which is processed by a receiver (not shown) to filter out and amplify the beat frequency signal to thereby detect target range and speed via Doppler frequency shift.

The beam from laser 60 is transmitted through beamsplitter 70, where a small portion is reflected to be used as the local oscillator beam. The transmitted portion of the beam is directed through a Brewster angle polarizer 72 to beam steerer 50 to provide X-Y steering of transmit beam 44 and to change the polarization of the, illustratively, parallel, or p-polarized, beam to, illustratively, left-circular polarization. The X-Y steered, left-circularly polarized beam 44 is now transmitted to targets in the field of view. Upon reflection from targets, the polarization of the reflected beam 46 has been mainly changed to, illustratively, right-circular polarization. The reflected beam 46 is then X-Y steered into interferometer 62 by beam steerer 50, which also changes the illustrative beam polarization from right-circular to linear by virtue of its transmission through quarter-wave plate 42. The linear polarization of beam 46 emerging from beam steerer 50 is now perpendicular to the plane of incidence of the beam on the Brewster angle polarizer 72, and the beam is referred to as being s-polarized. The received s-polarized beam is now reflected by surface 74 of Brewster angle polarizer 72 toward beam combiner 76, where it is reflected from surface 78 toward detector 64.

The portion of the beam reflected from surface 80 of beamsplitter 70, that is, the local oscillator beam, is directed by mirrored surface 82 through half-waveplate 84, which is used to rotate the plane of polarization of the p-polarized reference beam to match the s-polarization of the target reflected return beam. The polarization-corrected local oscillator beam is now combined with the return beam by beam combiner 76 and the optically combined beam may be focused by a lens (not shown) onto the light sensitive surface 86 of detector 64.

It will be seen that because the beams on the transmit and receive channels are orthogonally polarized, the steering elements of one channel should be neutral to the other. This allows independent steering of the two channels so that, for example, lag angle can be compensated.

While the principles of the present invention have been demonstrated with particular regard to the illustrated structure of the figures, it will be recognized that various departures may be undertaken in the practice of the invention. The scope of this invention is not intended to be limited to the particular structure disclosed herein, but instead be gauged by the breadth of the claims which follow.

What is claimed is:

1. In combination:
   first deflector means, responsive to beams of coherent optical radiation of first and second linear, orthogonally related polarizations, for deflecting said beams in first and second substantially orthogonally related directions;
   means for altering the linear polarization of a coherent beam of optical radiation by ninety degrees;
   second deflector means substantially identical to said first deflector means; and
   means for transforming the polarization of a coherent beam of optical radiation between linear and circular polarizations,
   all of the above-mentioned elements being arranged in the recited order along a common optical path.

2. The combination according to claim 1 wherein said first and second deflector means each comprises:
   a first optical beam deflector, responsive to a first coherent beam of optical radiation of a first linear polarization, for deflecting said first beam in a first substantially planar surface; and
   a second optical beam deflector, responsive to a second coherent beam of optical radiation of a second linear polarization orthogonal to said first linear polarization, for deflecting said second beam in a second substantially planar surface substantially orthogonal to said first planar surface.

3. The combination according to claim 1 wherein said altering means comprises a 90° polarization rotator.

4. The combination according to claim 3 wherein said polarization rotator comprises a half-wave plate.

5. The combination according to claim 1 wherein said transforming means comprises a quarter-wave plate.

6. The combination according to claim 2 wherein each of said optical beam deflectors comprises:
   a liquid crystal cell element including a first window having a common electrode, a second window having a multiplicity of electrodes in the form of electrically isolated parallel stripes, and a layer of liquid crystal molecules intermediate said first and second windows; and
   means for coupling a multiplicity of control signals individually between said multiplicity of stripe electrodes and said common electrode, thereby creating selectable local variations of refractive index in said liquid crystal layer.

7. The combination according to claim 6 wherein said common electrode is substantially transparent to light having wavelength of said optical beams.

8. The combination according to claim 6 wherein said multiplicity of stripe electrodes are substantially transparent to light having wavelength of said optical beams.

9. In combination:
   a first optical beam deflector, responsive to a first coherent beam of optical radiation of a first linear polarization, for deflecting said first beam in a first substantially planar surface;
   a second optical beam deflector, responsive to a second coherent beam of optical radiation of a second linear polarization orthogonal to said first linear polarization, for deflecting said second beam in a second substantially planar surface substantially orthogonal to said first planar surface;
   means for altering the linear polarization of a coherent beam of optical radiation by ninety degrees;
   a third optical beam deflector, responsive to a third coherent beam of optical radiation of said second linear polarization, for deflecting said third beam in said second substantially planar surface;
   a fourth optical beam deflector, responsive to a fourth coherent beam of optical radiation of said first linear polarization, for deflecting said fourth beam in said first substantially planar surface;
   means for transforming the polarization of a coherent beam of optical radiation between linear and circular polarizations,
   all of the above-mentioned elements being arranged in the recited order along a common optical path.

10. The combination according to claim 9 wherein said altering means comprises a 90° polarization rotator.

11. The combination according to claim 10 wherein said polarization rotator comprises a half-wave plate.

12. The combination according to claim 9 wherein said transforming means comprises a quarter-wave plate.

13. The combination according to claim 9 wherein each of said optical beam deflectors comprises:
   a liquid crystal cell element including a first window having a common electrode, a second window having a multiplicity of electrodes in the form of electrically isolated, parallel stripes, and a layer of liquid crystal molecules intermediate said first and second windows; and
   means for coupling a multiplicity of control signals individually between said multiplicity of stripe electrodes and said common electrode, thereby creating selectable local variations of refractive index in said liquid crystal layer.

14. The combination according to claim 13 wherein said common electrode is substantially transparent to light having wavelength of said optical beams.

15. The combination according to claim 13 wherein said multiplicity of stripe electrodes are substantially transparent to light having wavelength of said optical beams.

16. In an optical radar system wherein a beam of optical energy having a first circular polarization is transmitted toward a target and a target-reflected portion of said beam having a second circular polarization orthogonally related to said first circular polarization is returned to said system, apparatus for steering said transmitted beam toward said target and for steering said target-reflected portion to said system, said apparatus comprising:

first deflector means, responsive to beams of coherent optical radiation of first and second linear, orthogonally related polarizations, for deflecting said beams in first and second substantially orthogonally related directions;

means for altering the linear polarization of a coherent beam of optical radiation by ninety degrees;

second deflector means substantially identical to said first deflector means; and means for transforming the polarization of a coherent beam of optical radiation between linear and circular polarizations, all of the above-mentioned elements being arranged in the recited order along a common optical path.

17. The apparatus according to claim 16 wherein said first and second deflector means each comprises:

a first optical beam deflector, responsive to a first coherent beam of optical radiation of a first linear polarization, for deflecting said first beam in a first substantially planar surface; and a second optical beam deflector, responsive to a second coherent beam of optical radiation of a second linear polarization orthogonal to said first linear polarization, for deflecting said second beam in a second substantially planar surface substantially orthogonal to said first planar surface.

18. The apparatus according to claim 17 wherein each of said optical beam deflectors comprises:

a liquid crystal cell element including a first window having a common electrode, a second window having a multiplicity of electrodes in the form of electrically isolated parallel stripes, and a layer of liquid crystal molecules intermediate said first and second windows; and means for coupling a multiplicity of control signals individually between said multiplicity of stripe electrodes and said common electrode, thereby creating selectable local variations of refractive index in said liquid crystal layer.

19. In combination:

first deflector means, responsive to beams of coherent optical radiation of first and second linear, orthogonally related polarizations, for deflecting said beams in first and second substantially orthogonally related directions;

second deflector means substantially identical to said first deflector means; and means for transforming the polarization of a coherent beam of optical radiation between linear and circular polarizations, all of the above-mentioned elements being arranged in the recited order along a common optical path.

* * * * *